US010320512B2

(12) United States Patent
Nammi et al.

(10) Patent No.: US 10,320,512 B2
(45) Date of Patent: Jun. 11, 2019

(54) INTERFERENCE CANCELATION FOR 5G OR OTHER NEXT GENERATION NETWORK

(71) Applicant: AT&T Intellectual Property I, L.P., Atlanta, GA (US)

(72) Inventors: SaiRamesh Nammi, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/401,083

(22) Filed: Jan. 8, 2017

(65) Prior Publication Data
US 2018/0198548 A1 Jul. 12, 2018

(51) Int. Cl.
H04J 11/00 (2006.01)
H04L 27/26 (2006.01)

(52) U.S. Cl.
CPC ........ *H04J 11/004* (2013.01); *H04L 27/2657* (2013.01); *H04L 27/2691* (2013.01); *H04L 27/2675* (2013.01); *H04L 27/2695* (2013.01)

(58) Field of Classification Search
CPC .... H04J 11/004; H04L 5/0007; H04L 5/0048; H04L 5/0053; H04L 27/2602; H04L 27/2605; H04L 27/2607; H04L 27/2613; H04L 27/265; H04L 27/2666
See application file for complete search history.

(56) References Cited

U.S. PATENT DOCUMENTS

| 5,802,117 | A  | * | 9/1998 | Ghosh ............... H04L 27/2613 375/344 |
| 6,985,531 | B2 | * | 1/2006 | McCarty, Jr. ....... H04L 27/2602 341/143 |
| 6,993,294 | B2 |   | 1/2006 | Nobukiyo et al. |
| 7,088,782 | B2 | * | 8/2006 | Mody .................. H04L 1/0618 375/260 |
| 7,359,311 | B1 |   | 4/2008 | Paranjpe et al. |

(Continued)

FOREIGN PATENT DOCUMENTS

| CN | 103098399 A | * | 5/2013 | .......... H04W 72/082 |
| EP | 1983653 A1 | * | 10/2008 | ........... H04B 1/7107 |

(Continued)

OTHER PUBLICATIONS

"5G Waveform & Multiple Access Techniques," Nov. 2015, Qualcomm Technologies, Inc., 46 pages. http://www.ee.iitm.ac.in/~giri/pdfs/EE5141/Qualcomm-5g-Waveforms.pdf.

(Continued)

Primary Examiner — Eric Nowlin
(74) Attorney, Agent, or Firm — Amin, Turocy & Watson, LLP

(57) ABSTRACT

An interference cancelation receiver can cancel channel state information reference signal interference using a single fast fourier transform (FFT), thereby reducing the complexity of the receiver. The transmitter can multiplex a channel state information reference signal (CSI-RS) with a physical downlink shared channel (PDSCH) of another numerology, thereby improving a resource utilization. Thus, significant gains in link and system throughputs can be achieved via the use of the interference cancelation receiver.

20 Claims, 13 Drawing Sheets

(56) References Cited

U.S. PATENT DOCUMENTS

| | | | |
|---|---|---|---|
| 7,386,306 B2 * | 6/2008 | Laroia | H04L 5/0007 455/266 |
| 7,450,548 B2 | 11/2008 | Haustein et al. | |
| 7,499,515 B1 | 3/2009 | Beadle | |
| 7,567,502 B2 * | 7/2009 | Laroia | H04L 5/0042 370/208 |
| 7,633,924 B2 * | 12/2009 | Fujii | H04L 27/2602 370/328 |
| 7,706,458 B2 * | 4/2010 | Mody | H04L 27/2659 375/260 |
| 7,787,358 B2 * | 8/2010 | Wilhelmsson | H04L 25/03006 370/208 |
| 7,813,371 B2 | 10/2010 | McNew et al. | |
| 7,826,541 B2 * | 11/2010 | Fujii | H04B 7/15585 370/294 |
| 7,885,214 B2 | 2/2011 | Ahmadi et al. | |
| 8,018,855 B2 | 9/2011 | Englund et al. | |
| 8,077,595 B2 | 12/2011 | Bhushan et al. | |
| 8,159,979 B2 | 4/2012 | Lee et al. | |
| 8,223,737 B2 * | 7/2012 | Nangia | H04L 25/061 370/310 |
| 8,259,695 B2 | 9/2012 | Lee et al. | |
| 8,259,828 B2 * | 9/2012 | Fu | H04L 25/03159 370/208 |
| 8,369,468 B2 | 2/2013 | da Silva et al. | |
| 8,400,939 B2 | 3/2013 | Kim et al. | |
| 8,576,936 B2 * | 11/2013 | Ericson | H04L 5/0044 375/259 |
| 8,605,687 B2 | 12/2013 | Barak et al. | |
| 8,634,334 B2 | 1/2014 | Ahmadi | |
| 8,634,363 B2 | 1/2014 | Kim et al. | |
| 8,780,941 B2 | 7/2014 | Dor et al. | |
| 8,842,628 B2 | 9/2014 | Gao et al. | |
| 8,913,479 B2 | 12/2014 | Bhushan et al. | |
| 8,917,686 B2 | 12/2014 | Lee et al. | |
| 8,953,615 B2 | 2/2015 | Cai et al. | |
| 8,989,208 B2 | 3/2015 | Chen et al. | |
| 9,036,520 B2 | 5/2015 | Montojo et al. | |
| 9,065,586 B2 * | 6/2015 | Jacob | H04J 11/0069 |
| 9,094,966 B2 | 7/2015 | Kim et al. | |
| 9,100,093 B2 | 8/2015 | Branlund et al. | |
| 9,100,870 B2 | 8/2015 | Yang et al. | |
| 9,148,256 B2 | 9/2015 | Sampath et al. | |
| 9,160,439 B2 | 10/2015 | Li | |
| 9,210,712 B2 * | 12/2015 | Hwang | H04W 72/082 |
| 9,264,249 B2 | 2/2016 | Zhang et al. | |
| 9,300,424 B2 | 3/2016 | Seo et al. | |
| 9,351,293 B2 | 5/2016 | Chen et al. | |
| 9,439,135 B2 | 9/2016 | Ahn et al. | |
| 9,444,535 B2 | 9/2016 | Dinan | |
| 9,479,300 B2 | 10/2016 | Kim et al. | |
| 9,509,464 B2 | 11/2016 | Cai et al. | |
| 9,516,644 B2 | 12/2016 | Pan et al. | |
| 9,531,521 B2 | 12/2016 | Ng | |
| 9,717,086 B2 * | 7/2017 | Zhang | H04L 5/0041 |
| 9,820,281 B1 * | 11/2017 | Werner | H04W 72/0453 |
| 2002/0181509 A1 * | 12/2002 | Mody | H04L 1/0618 370/480 |
| 2003/0016622 A1 * | 1/2003 | McCarty, Jr. | H04L 27/2602 370/207 |
| 2005/0190822 A1 * | 9/2005 | Fujii | H04B 7/15585 375/211 |
| 2005/0233752 A1 * | 10/2005 | Laroia | H04L 5/0007 455/450 |
| 2006/0239370 A1 * | 10/2006 | Mody | H04L 27/2659 375/260 |
| 2008/0144486 A1 * | 6/2008 | Wilhelmsson | H04L 25/03006 370/208 |
| 2008/0165866 A1 | 7/2008 | Teo et al. | |
| 2009/0022050 A1 | 1/2009 | Ohta | |
| 2009/0202010 A1 * | 8/2009 | Fu | H04L 25/03159 375/260 |
| 2011/0103243 A1 | 5/2011 | Larsson et al. | |
| 2011/0182332 A1 * | 7/2011 | Ericson | H04L 5/0044 375/219 |
| 2011/0269442 A1 | 11/2011 | Han et al. | |
| 2012/0307706 A1 | 12/2012 | Nakano et al. | |
| 2013/0028150 A1 | 1/2013 | Ma et al. | |
| 2013/0170464 A1 * | 7/2013 | Hwang | H04W 72/082 370/329 |
| 2013/0194931 A1 | 8/2013 | Lee et al. | |
| 2013/0295925 A1 * | 11/2013 | Jacob | H04J 11/0069 455/434 |
| 2014/0044040 A1 | 2/2014 | Chen et al. | |
| 2014/0086188 A1 | 3/2014 | Hoymann et al. | |
| 2014/0126485 A1 | 5/2014 | Chen et al. | |
| 2014/0177457 A1 | 6/2014 | Grosspietsch et al. | |
| 2014/0179363 A1 | 6/2014 | Nishikawa et al. | |
| 2014/0341051 A1 | 11/2014 | Gaal et al. | |
| 2015/0029875 A1 | 1/2015 | Zhu et al. | |
| 2015/0131560 A1 | 5/2015 | Von Elbwart et al. | |
| 2015/0131756 A1 | 5/2015 | Suh et al. | |
| 2015/0146653 A1 * | 5/2015 | Zhang | H04L 5/0041 370/329 |
| 2015/0180622 A1 | 6/2015 | Yoo et al. | |
| 2015/0200755 A1 | 7/2015 | Hammarwall et al. | |
| 2015/0223245 A1 | 8/2015 | Cheng et al. | |
| 2015/0257139 A1 | 9/2015 | Chen et al. | |
| 2015/0288475 A1 | 10/2015 | Tabet et al. | |
| 2015/0312927 A1 | 10/2015 | Ko et al. | |
| 2015/0349987 A1 | 12/2015 | Soriaga et al. | |
| 2015/0372851 A1 | 12/2015 | Kakishima et al. | |
| 2016/0006487 A1 | 1/2016 | Ding et al. | |
| 2016/0143055 A1 | 5/2016 | Nammi et al. | |
| 2016/0156397 A1 | 6/2016 | Onggosanusi et al. | |
| 2016/0156401 A1 | 6/2016 | Onggosanusi et al. | |
| 2016/0182134 A1 * | 6/2016 | Kol | H04B 7/0456 370/329 |
| 2016/0248555 A1 * | 8/2016 | Lei | H04L 5/0005 |
| 2016/0255611 A1 | 9/2016 | Damnjanovic et al. | |
| 2016/0294531 A1 | 10/2016 | Loehr et al. | |
| 2016/0337056 A1 | 11/2016 | Frenne et al. | |
| 2016/0352551 A1 * | 12/2016 | Zhang | H04L 27/2602 |
| 2016/0373195 A1 | 12/2016 | Kato et al. | |
| 2017/0099126 A1 * | 4/2017 | Yoo | H04L 5/0048 |
| 2017/0118055 A1 * | 4/2017 | Guey | H04L 1/0005 |
| 2017/0134199 A1 * | 5/2017 | Wang | H04W 74/0833 |
| 2017/0215170 A1 | 7/2017 | Islam et al. | |
| 2017/0325250 A1 * | 11/2017 | Manolakos | H04L 27/2602 |
| 2017/0332378 A1 * | 11/2017 | Werner | H04W 72/0453 |
| 2018/0049047 A1 | 2/2018 | Lin et al. | |
| 2018/0049222 A1 | 2/2018 | Manolakos et al. | |
| 2018/0092002 A1 * | 3/2018 | Manolakos | H04L 5/0007 |
| 2018/0098312 A1 | 4/2018 | Lin et al. | |
| 2018/0109406 A1 * | 4/2018 | Wang | H04L 5/0007 |

FOREIGN PATENT DOCUMENTS

| | | | | |
|---|---|---|---|---|
| EP | 2618504 A2 * | 7/2013 | | H04W 72/082 |
| EP | 2771999 A2 | 9/2014 | | |
| JP | 09284200 A | 10/1997 | | |
| JP | 2010178237 A | 8/2010 | | |
| KR | 20120028203 A * | 3/2012 | | H04W 72/082 |
| KR | 20120061881 A | 6/2012 | | |
| KR | 101480531 B1 * | 1/2015 | | H04W 72/082 |
| KR | 101617348 B1 | 5/2016 | | |
| RU | 2530749 C2 | 10/2014 | | |
| RU | 2545527 C2 | 4/2015 | | |
| WO | 2009052420 A2 | 4/2009 | | |
| WO | 2010138921 A2 | 12/2010 | | |
| WO | WO-2012036439 A2 * | 3/2012 | | H04W 72/082 |
| WO | 2012041016 A2 | 4/2012 | | |
| WO | WO-2012036439 A3 * | 5/2012 | | H04W 72/082 |
| WO | 2013135140 A1 | 9/2013 | | |
| WO | 2014021986 A1 | 2/2014 | | |
| WO | 2014107904 A1 | 7/2014 | | |
| WO | 2016066231 A1 | 5/2016 | | |
| WO | WO-2016099830 A1 * | 6/2016 | | H04B 7/0456 |
| WO | 2016123393 A1 | 8/2016 | | |
| WO | 2016130175 A1 | 8/2016 | | |

(56) References Cited

FOREIGN PATENT DOCUMENTS

| WO | 2016146165 A1 | 9/2016 |
|---|---|---|
| WO | 2016153548 A1 | 9/2016 |
| WO | 2016172652 A1 | 10/2016 |

OTHER PUBLICATIONS

Agyapong et al., "Design Considerations for a 5G Network Architecture," IEEE Communications Magazine, 2014, pp. 65-75, vol. 52, No. 11, 19 pages. https://pdfs.semanticscholar.org/cf82/05dddcf91b86814a18e6859b4d894f6b482c.pdf.

Levanen et al., "Radio Interface Evolution Towards 5G and Enhanced Local Area Communications," IEEE Access Journals & Magazines, 2014, vol. 2, pp. 1005 1029, 25 pages. http://ieeexplore.ieee.org/stamp/stamp.jsp?tp=&arnumber=6891105.

Mogensen et al., "5G Small Cell Optimized Radio Design," Globecom, IEEE Conference and Exhibition, 2013, 7 pages. https://pdfs.semanticscholar.org/ef23/9f901429824d81c5572c4fad9977c8eb26d9.pdf.

Pitaval et al., "Spectrally-Precoded OFDM for 5G Wideband Operation in Fragmented sub-6GHz Spectrum," 2016, 12 pages. https://arxiv.org/ftp/arxiv/papers/1606/1606.00623.pdf.

Rajagopal et al., "Multi-User MIMO with Flexible Numerology for 5G," 2016, 6 pages. https://arxiv.org/ftp/arxiv/papers/1610/1610.03056.pdf.

"OFDM Systems Why Cyclic Prefix?" Feb. 2008, 4 pages. http://sites.google.com/site/mdanishnisar/pubs/01_OFDM_Tutorial_Nisar.pdf.

Luo et al., "Millimetre-Wave Air-Interface for 5G: Challenges and Design Principles," ETSI Workshop of Future Radio Technologies—Air Interfaces, Jan. 2016, 10 pages. https://docbox.etsi.org/Workshop/2016/201601_FUTURERADIOTECHNOL_WORKSHOP/S04_NEW_RADIO_ACCESS_TECHNO SERV_ENVIR_PART_1/mmMAGIC_CHALLENGES_DESIGN_PRINCIP_paper.pdf.

Simsek et al., "5G-Enabled Tactile Internet," IEEE Journal on Selected Areas in Communications, Mar. 2016, pp. 460-473, vol. 34, No. 3. 14 pages. https://www.researchgate.net/profile/Adnan_Aijaz/publication/294108489_5GEnabled_Tactile_Internet/links/572a56f908aef5d48d30cc16.pdf.

Popovski et al., "Mobile and Wireless Communications Enablers for the Twenty-Twenty Information Society (METIS)," Proposed Solutions for New Radio Access, Document Number: ICT-317669-METIS/D2.4, 2015, 190 pages. http://publications.lib.chalmers.se/records/fulltext/220587/local_220587.pdf.

Wild et al., "A Reduced Complexity Transmitter for UF OFDM," IEEE 81st Vehicular Technology Conference (VTC Spring), 2015, IEEE, 6 pages. https://www.researchgate.net/publication/276419672_A_reduced_complexity_transmitter_for_UF-OFDM.

Non-Final Office Action received for U.S. Appl. No. 15/341,927 dated Aug. 6, 2018, 35 Pages.

Non-Final Office Action received for U.S. Appl. No. 15/400,379 dated Jun. 29, 2018, 40 Pages.

Notice of Allowance received for U.S. Appl. No. 15/341,927 dated Feb. 6, 2019, 26 pages.

* cited by examiner

INTERFERENCE CANCELATION FOR 5G OR OTHER NEXT GENERATION NETWORK

TECHNICAL FIELD

This disclosure relates generally to facilitating interference cancellation. For example, this disclosure relates to facilitating interference cancellation for new radios (NR) in a mixed numerology operation for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to a non-orthogonal design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
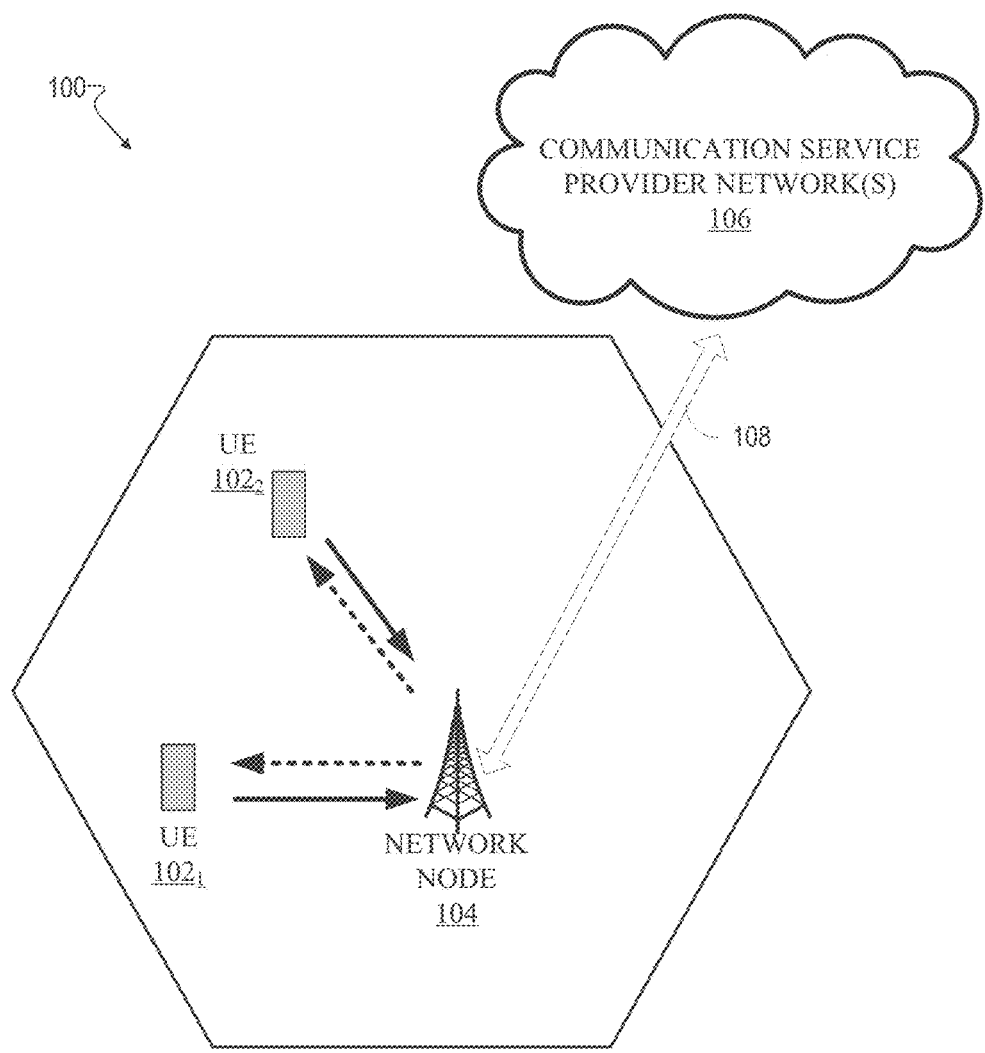
FIG. 1 illustrates an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate interference cancellation for NRs in a mixed numerology operation for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate interference cancellation for NRs in a mixed numerology operation for a 5G network. Facilitating interference cancellation for NRs in a mixed numerology for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are also applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied to 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier systems such as orthogonal frequency division multiplexing (OFDM), each subcarrier can occupy bandwidth (e.g., subcarrier spacing). If the carriers use the same bandwidth spacing, then the subcarriers can be considered to comprise a single numerology (i.e., single subcarrier spacing). However, if the subcarriers occupy different bandwidth and/or spacing, then the subcarriers can be considered to comprise multiple numerologies (i.e., multiple subcarrier spacing). A subcarrier with a different numerology can interfere with another subcarrier and/or subcarrier spacing.

Downlink reference signals can be predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

CSI-RS signal transmission is important for estimating the CSI. Although resources needed for CSI-RS can be small, when multiple numerologies are deployed within the same OFDM bandwidth, using a conventional approach (as in LTE), estimating the CSI can comprise a CSI-RS resource grid for every numerology. Time-frequency resources for CSI-RS can be high and occupy a lot of bandwidth, thereby reducing the number of resources for data transmission. Therefore, significant loss in data throughput can limit the system capacity.

Disclosed herein is a receiver that can cancel the CSI-RS interference using a single FFT, even when the numerology of the CSI-RS and the data channel are different, thereby reducing the complexity of the receiver. Hence a transmitter can multiplex CSI-RS with PDSCH of various numerologies (e.g., subcarrier or subcarrier spacing) thereby improving resource utilization. Therefore, significant gains in link and system throughputs can be achieved.

Rate matching in PDSCH is a block in baseband processing. The basic function of a rate matching module is to match the number of bits in a transport block (TB) to the number of bits that can be transmitted in the given allocation. Rate matching can comprise sub-block interleaving, bit collection, and pruning. In PDSCH, rate matching can be performed by the PDSCH TB being segmented into code blocks (CB) if its size is greater than 6144 bits. Otherwise there can be no segmentation of the TB, but the TB and CB can be of same size. Rate matching can be performed over code blocks and performed after the code blocks have undergone turbo encoding. The turbo encoder can perform a 1/3 rate encoding. For example, for every single input bit, 3 output bits can be provided in which the first bit is the original input bit called as a systematic bit, and the remaining two bits can be an interleaved version of the input bit called parity1 and parity2 bits. These three streams of systematic, partity1, and parity2 bits can be fed as input to a rate matching module.

In a mixed numerology case, the performance of a physical downlink shared channel (PDSCH) can be improved by multiplexing the PDSCH of one numerology with the CSI-RS of another numerology and the use of an advanced receiver. However, due to the interference from the PDSCH of the other numerology, the channel estimation for the underlying UE can be impacted if the CSI-RS is corrupted. An adaptive CSI-RS configuration can be deployed where the CSI-RS density is adapted based on the PDSCH transmission of the other numerology. Namely, based on the scheduling decision of the other numerology, the CSI-RS density can be changed. Thus, the impact on channel estimation can be minimized when the data channel of one numerology is multiplexed with the CSI-RS of the other numerology. Thus, with the increase in CSI-RS density, the mean square error reduces, thereby providing significant gains in link and system throughputs.

For a mixed numerology case, rate matching can be inefficient and depend on the numerology mix. Therefore, the underlying PDSCH should be rate matched around the CSI-RS. Alternatively, the PDSCH transmitted can be multiplexed via superposition transmission with the CSI-RS of the other numerology. For example, the scenario of 15 KHZ and 60 KHZ mixing can comprise two resource elements allocated for CSI-RS transmission. Then, for the PDSCH transmission for 15 KHz subcarrier spacing, a multiplex of 2*(60/15) can equal 8 resource elements. Therefore, significant gains can be expected for higher numerologies with the proposed system where these 8 resource elements will not be lost from the PDSCH for CSI-RS transmissions. Note that the above system assumes that the underlying receiver can cancel the CSI-RS interference due to a 15 KHz spacing carrier. Also note that since CSI-RS and PDSCH are multiplexed, additional CSI-RS resources can be used for better channel estimation. The above technique can be extended by varying (reducing/increasing) the power of CSI-RS of the higher numerology carrier and using higher density of CSI-RS resources. Consequently, the receiver does not require cancelling of the CSI-RS of the other numerology.

The UE can estimate the channel from the CSI-RS and also detect data when the CSI-RS is multiplexed with the data channel. For channel estimation at the receiver side, the UE can leverage the following equations. The received signal for the $K^{th}$ subcarrier can be written as:

$$y(k)=H(k)x(k)+n, \quad \text{Equation (1)}$$

where: Y(k) is a received complex symbol value, X(k) is a transmitted complex symbol value, H(k) is a complex channel gain experienced by a symbol, and N is the complex noise and interference caused by the other numerology.

Since CSI-RS can carry the known pilot symbols at the transmitter and at the receiver, the channel estimate can be given by He(k) and computed based on either least squares, mean square estimation (MSE), or another estimation technique. For example, using least squares can compute:

$$He(k)=y^h(k)x^h(k) \quad \text{Equation (2)}$$

For data estimation for the numerologies, which are different compared to the CSI-RS numerology, the received signal for the $j^{th}$ subcarrier can be written as:

$$y(j)=H(j)x(j)+Hr(j)xr(j)+n \quad \text{Equation (3)}$$

where, Y(j) is a received complex symbol value, X(j) is a transmitted complex symbol value, H(j) is a complex channel gain experienced by a symbol, Hr(j) is a complex channel gain experienced by a symbol in the CSI-RS numerology, Xr(j) is the CSI-RS transmitted symbol, and N is the complex noise. Since the receiver can estimate the channel, the receiver can subtract the contribution due to CSI-RS in this numerology.

Hence, after subtraction, the received signal can be given by:

$$y(j)-Hr(j)xr(j)=H(j)x(j)+n \quad \text{Equation (4)}$$

Once the component due to CSI-RS is subtracted from the received signal, conventional detection techniques can be used to detect the data in the other numerology.

When mixed numerologies are deployed within one OFDM carrier, there are instances when one numerology UE can be scheduled in any part of the OFDM bandwidth. For instance, one numerology can be scheduled in one part of the OFDM bandwidth and in another instance, another numerology (e.g., the interfering numerology can be scheduled in another part of the OFDM bandwidth. In these cases, the CSI-RS density can to adapt according to the PDSCH location of the interfering numerology. Hence the CSI-RS density can depend on the scheduling decision. Therefore the network can indicate the CSI-RS density on those resource blocks where the PDSCH location of the other numerology is mixed with CSI-RS dynamically. In one technique, the network can send this information to the physical layer signaling, such as a request to send the CSI at irregular intervals (aperiodic) and/or on demand CSI as part of the uplink control channel or the downlink control channel.

In the case of a semi-static indication of CSI-RS density, if the network decides to use a different numerology PDSCH in certain resource blocks for longer time periods, then the network can configure those resource blocks with high CSI-RS density and inform the UE about the pattern using RRC signaling.

Figure 6:
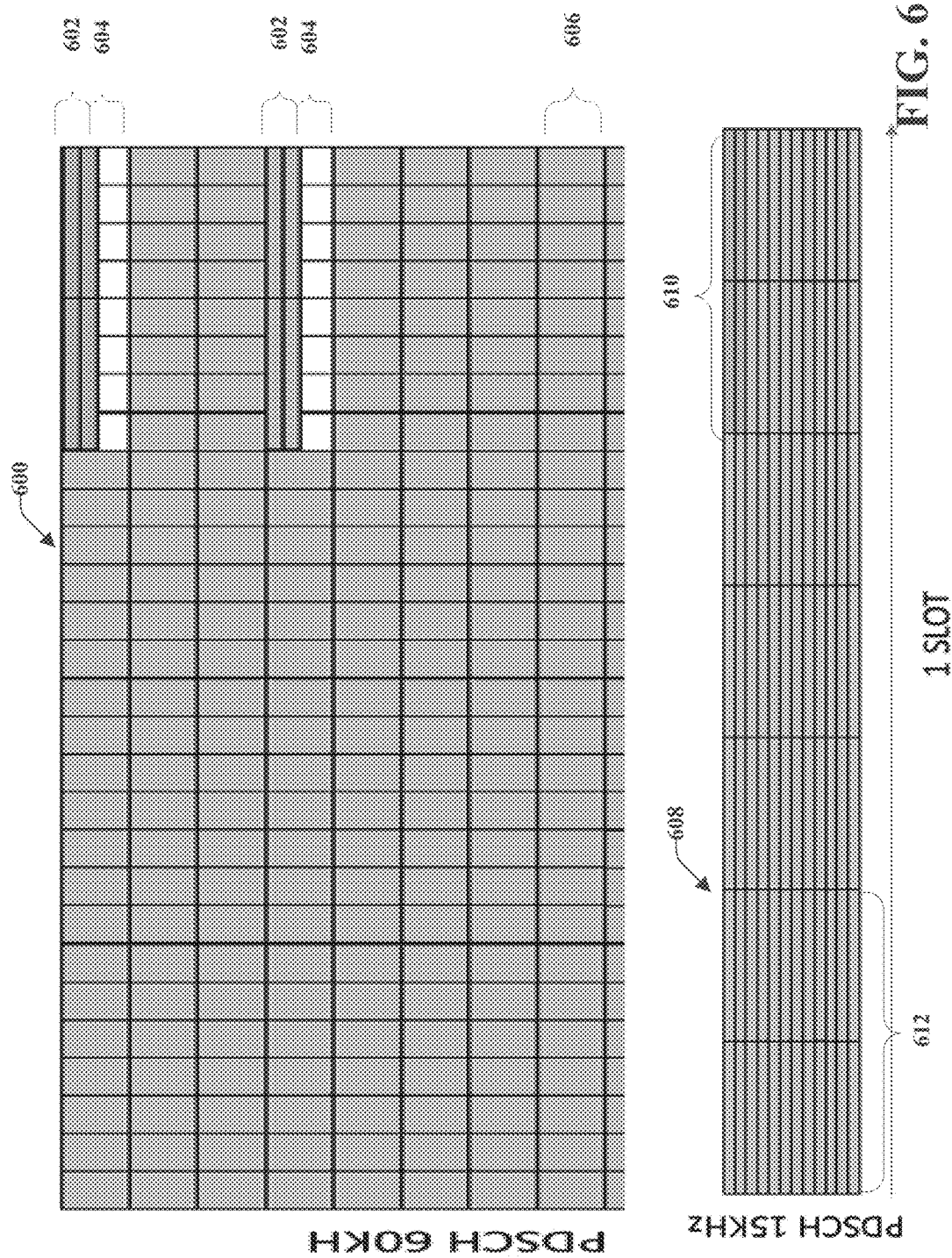
FIG. 6 illustrates an example schematic system block diagram of a 15 KHz channel state information reference signal transmission with mixed numerology according to one or more embodiments.
Figure 7:
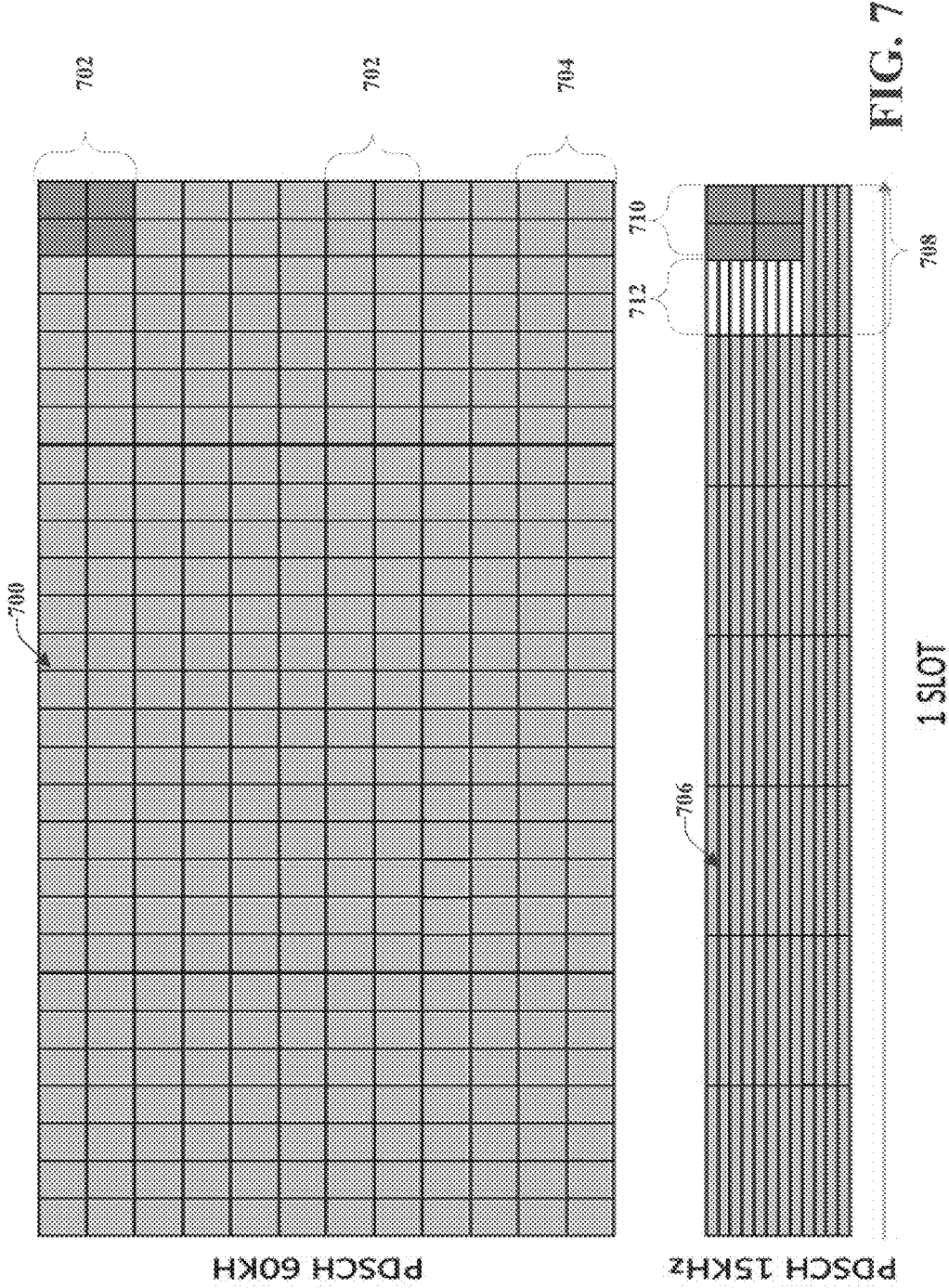
FIG. 7 illustrates an example schematic system block diagram of a 60 KHz channel state information reference signal transmission with mixed numerology according to one or more embodiments.

CSI-RS transmission is important for estimating the CSI. The resources needed for CSI-RS are, in general, very small and are transmitted over the entire OFDM bandwidth. With mixed numerologies configured in the same OFDM carrier, the CSI-RS can be transmitted using the approach depicted in FIGS. 6 and 7. FIGS. 6 and 7 depict some of the example cases where the PDSCH and CSI-RS are multiplexed with different numerologies. For a mixed numerology case, the REs between the separate numerologies are inherently non-orthogonal, so even if the PDSCH is rate matched around the CSI-RS, there is potential interference between the CSI and PDSCH. Consequently, even if the PDSCH is rate matched around the CSI-RS, the PDSCH demodulation can still suffer from interference from the CSI-RS due to the numerology mixing. Therefore, the PDSCH signal can skip the entire symbol in which the CSI-RS is transmitted. Such a symbol level rate matching is very in efficient since it wastes a lot of resources.

Although the proposed interference cancellation receiver concept is explained with reference to downlink, it should be noted that the same principle can be applied for uplink as well as side link. For purposes of this disclosure, the mixed numerology signal comprises PDSCH and CSI-RS with different numerologies. However, the concept is not just limited to the CSI-RS case only and can be extended to any other known signal that needs to be canceled. The framework for this disclosure works for cancellation of signals that are known a-priori by the receiver such as CSI-RS, or any other RS, PBCCH, synchronization/beam management signal, etc.

Signal complexity can be reduced by choosing the proposed interference cancellation receiver whenever there is a PDSCH failure. For instance, the receiver can first decode the PDSCH without CSI-RS interference cancellation. However if the PDSCH fails (e.g., cyclic redundancy check fail), then rather than sending HARQ-NAK to the transmitter, the UE can use the proposed interference cancellation receiver to remove the interference from the CSI-RS of the other numerology.

There are two methods to communicate the interfering CSI-RS pattern and the CSI-RS numerology to the UE. In the first case, when mixed numerologies are deployed within one OFDM carrier, there are instances when one numerology UE can be scheduled in any part of the OFDM bandwidth (e.g., in one instance it can be scheduled in one part of the OFDM bandwidth and in another instance it can be scheduled in another part of the OFDM bandwidth). In these cases, the CSI-RS configuration might be different for the time instance. Hence the network can indicate the interfering CSI-RS configuration and the numerology dynamically. The network can send this information to the physical layer signaling, via the downlink control channel. For instance, a base station of the network can indicate the interference CSI-RS when scheduling parameters for the UE and provide the UE with the option to cancel the interference.

In the second case, instead of sending the interfering CSI-RS configuration, the network can indicate all tentative interfering CSI-RS possibilities and the numerologies a-prior to the UE using RRC signaling. For instance, the base station can indicate all possible interference signals, which can allow the UE to cancel the interference as it sees fit.

In one embodiment, described herein is a method comprising based on a first subcarrier spacing of a wireless network analyzing signal interference data representative of a signal interference, and based on a first result of the analyzing by the mobile device, a cause of the signal interference. In response to the determining, the method can comprise decoding, by the mobile device using a sampling rate, the signal interference data, and decoding channel state data associated with a channel state data reference signal, wherein the channel state data is further associated with a second subcarrier spacing of the mobile device. Consequently, based on the signal interference data and the channel state data, the method can determine an estimated channel response frequency. Based on the signal interference, the method can generate an equivalent signal interference generated to be equivalent to the signal interference, wherein the equivalent signal interference has been modified as a function of the estimated channel response frequency, resulting in an estimated cancellation signal. Furthermore, based on the estimated cancellation signal, the method can comprise canceling a received signal from the network device of the wireless network.

According to another embodiment, a system can facilitate, based on a first subcarrier spacing of a wireless network, analyzing signal interference data representative of a signal interference, and determining a cause of the signal interference. In response to the determining and to determine an estimated channel response frequency, the system can facilitate decoding the signal interference data using a sampling rate, and decoding channel state data, associated with a channel state data reference signal, and associated with a second subcarrier spacing of the wireless network. In response to a condition being determined to have been satisfied, the system can generate an equivalent signal interference to the signal interference. Additionally, the system can modify the equivalent signal interference as a function of the estimated channel response frequency, resulting in an estimated cancellation signal. Thus, based on the estimated cancellation signal, the system can facilitate canceling a received signal from the network device of the wireless network.

According to yet another embodiment, described herein is a machine-readable storage medium that can perform the operations comprising receiving first channel state data reference signals associated with first signal interference data. In response to the receiving the first channel state data reference signals, the operations can comprise facilitating canceling the first channel state data reference signals based on a condition associated with a mobile device. Based on a first subcarrier spacing of a wireless network, the operations can comprise analyzing second signal interference data representative of a second channel state data reference signal, not of the first channel state data reference signals. Furthermore, based on the analyzing, the operations can comprise decoding the second signal interference data and decoding the channel state data to determine an estimated channel response frequency.

These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., 1021, 1022 . . . 102*n*), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, pico-cell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
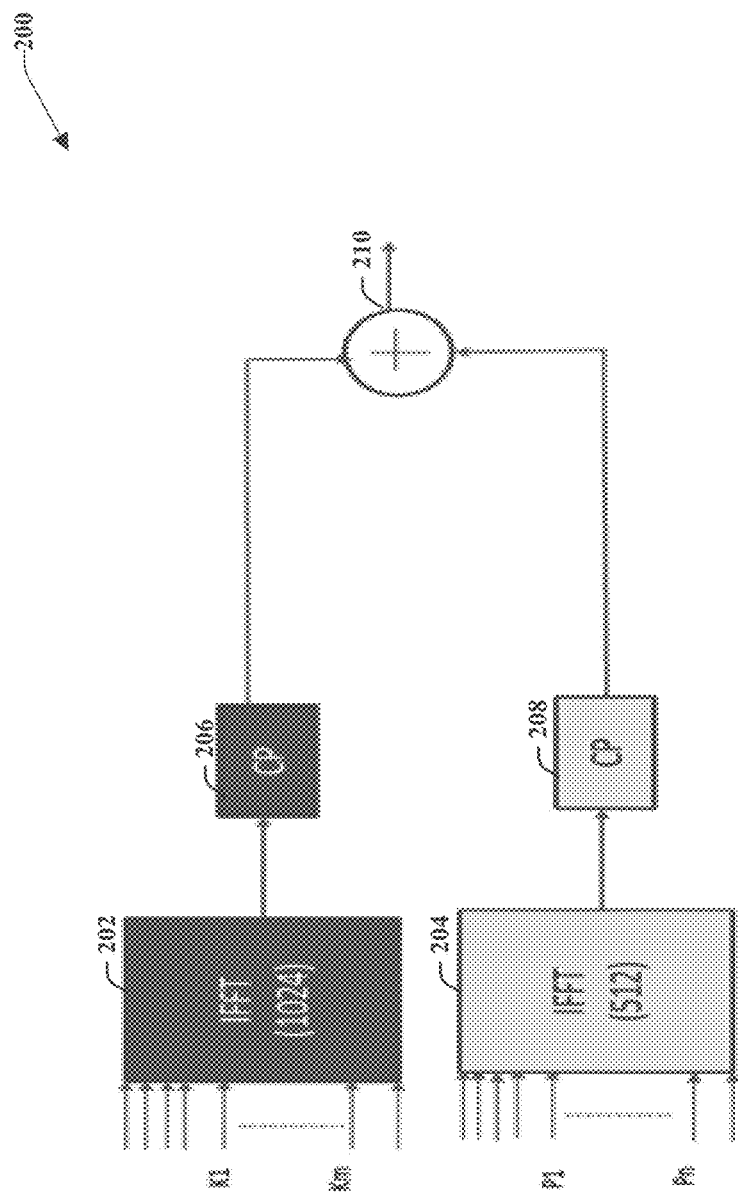
FIG. 2 illustrates an example schematic system block diagram of cyclic prefix orthogonal frequency-division multiplexing with mixed numerology according to one or more embodiments.

Referring now to FIG. 2, illustrated is an example schematic system block diagram of cyclic prefix orthogonal frequency-division multiplexing with mixed numerology according to one or more embodiments. As an example of multiple numerology, FIG. 2 depicts the block diagram of the CP-OFDM transmitter in the mixed numerology case 200. The upper branch 202 uses numerology with subcarrier spacing of 15 KHz spacing, while the lower branch 204 uses subcarrier spacing of 30 KHz. The lower branch 204 can generate two OFDM symbols during the time the upper branch 202 can generate one OFDM symbol. If K1 to Km represent subcarrier indices for 15 KHz spacing and P1 to Pn represent subcarrier indices for 30 KHz spacing, then orthogonality can be lost due to mixed numerology. However, guard tones G, can be used to balance Equation 5, below, between the numerologies. Therefore, if G is the number of guard tones between these two numerologies, then:

$$P_1 = \frac{K_M}{2} + G, \quad \text{Equation (5)}$$

cyclic-prefixes 206, 208 can be used to mitigate interference introduced by the upper branch 202 and the lower branch 204, respectively. Additionally, a summation block 210 can be used to apply the guard tones to assist in interference reduction.

Figure 3:
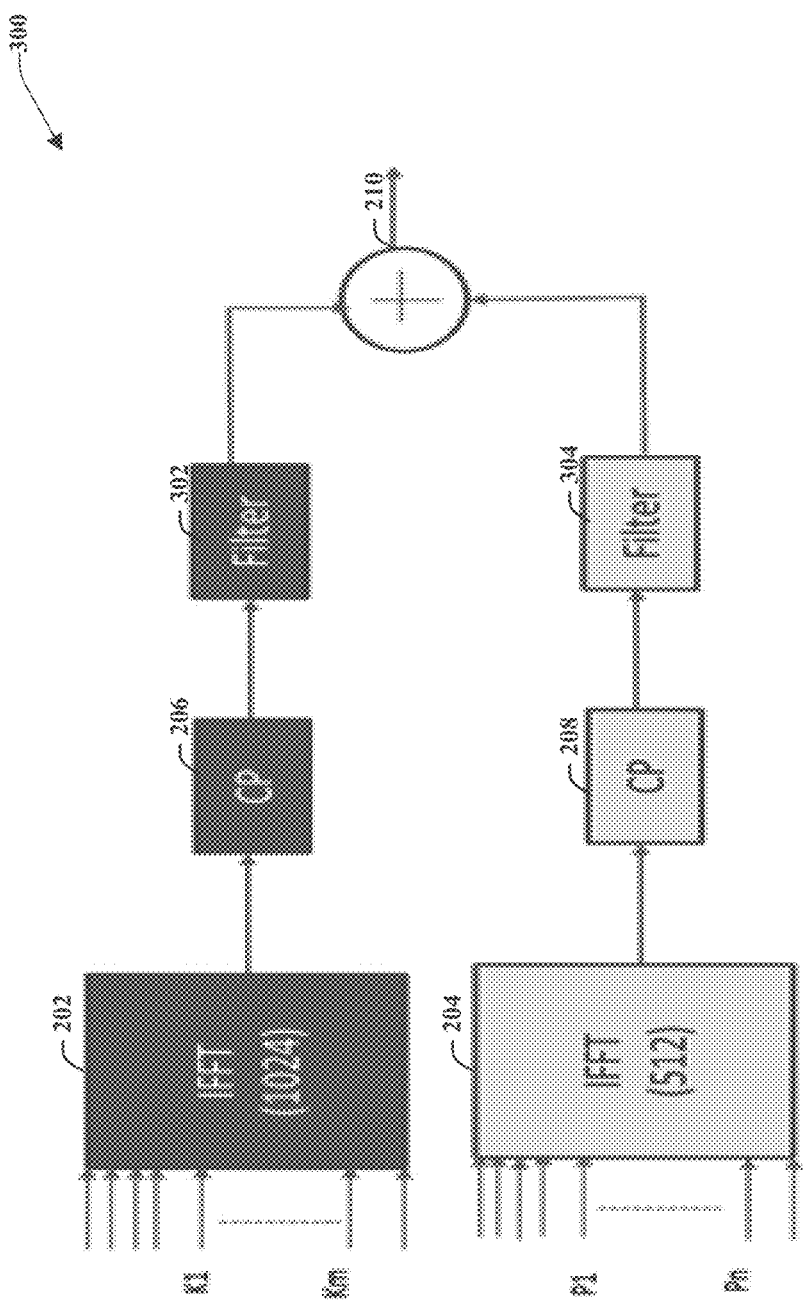
FIG. 3 illustrates an example schematic system block diagram of filtered orthogonal frequency-division multiplexing with mixed numerology according to one or more embodiments.

Referring now to FIG. 3, illustrated is an example schematic system block diagram of filtered orthogonal frequency-division multiplexing with mixed numerology according to one or more embodiments. FIG. 3 depicts the block diagram for a filtered OFDM with mixed numerology 300. The upper branch 202 uses numerology with subcarrier spacing of 15 KHz spacing, while the lower branch 204 uses subcarrier spacing of 30 KHz. The lower branch 204 can generate two OFDM symbols during the time the upper branch 202 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 5, between the numerologies. Therefore, if G is the number of guard tones between these two numerologies, then cyclic-prefixes 206, 208 can be used to mitigate interference introduced by the upper branch 202 and the lower branch 204, respectively. Furthermore, each branch can leverage a transmission filter 302, 304 to minimize interference. The transmission filters 302, 304 can reduce certain aspects of the signals received from the cyclic-prefixes 206, 208, namely signal interference. Additionally, a summation block 210 can be used to apply the guard tones to assist in interference reduction.

Figure 4:
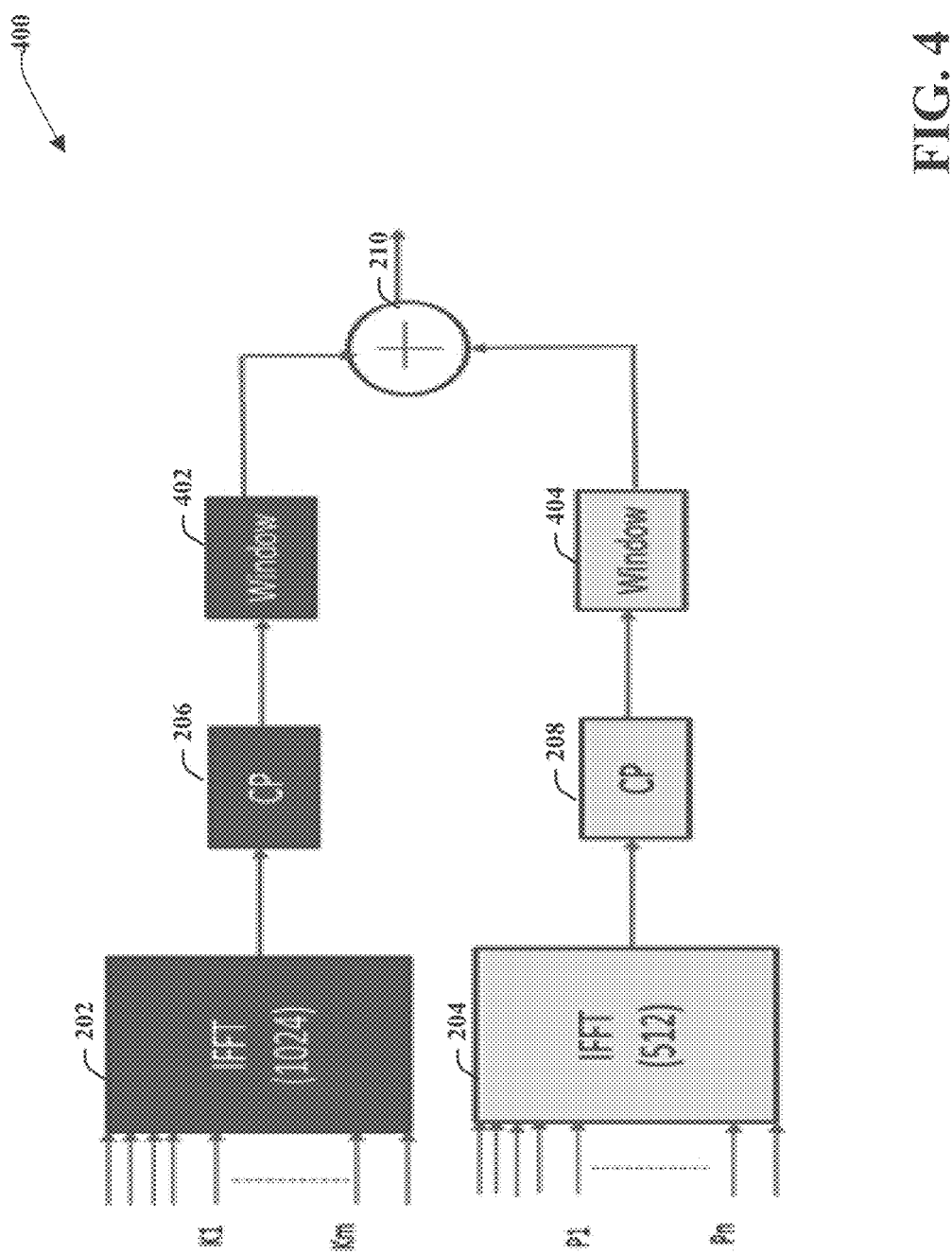
FIG. 4 illustrates an example schematic system block diagram of a windowed orthogonal frequency-division multiplexing with mixed numerology according to one or more embodiments.

Referring now to FIG. 4, illustrated is an example schematic system block diagram of a windowed orthogonal frequency-division multiplexing with mixed numerology according to one or more embodiments. FIG. 4 depicts the block diagram for windowed OFDM with mixed numerology 400. The upper branch 202 uses numerology with subcarrier spacing of 15 KHz spacing, while the lower branch 204 uses subcarrier spacing of 30 KHz. The lower branch 204 can generate two OFDM symbols during the time the upper branch 202 can generate one OFDM symbol. If K1 to Km represent sub carrier indices for 15 KHz spacing and P1 to Pn represent subcarrier indices for 30 KHz spacing, then orthogonality can be lost due to mixed numerology. However, guard tones G, can be used to balance Equation 5, between the numerologies. Therefore, if G is the number of guard tones between these two numerologies, then cyclic-prefixes 206, 208 can be used to mitigate interference introduced by the upper branch 202 and the lower branch 204, respectively. Furthermore, each branch can leverage window technique blocks 402, 404 to minimize interference. The window technique blocks 402, 404 can reduce interference in the time domain of the signals received from the cyclic-prefixes 206, 208. Additionally, a summation block 210 can be used to apply the guard tones to assist in interference reduction.

Figure 5:
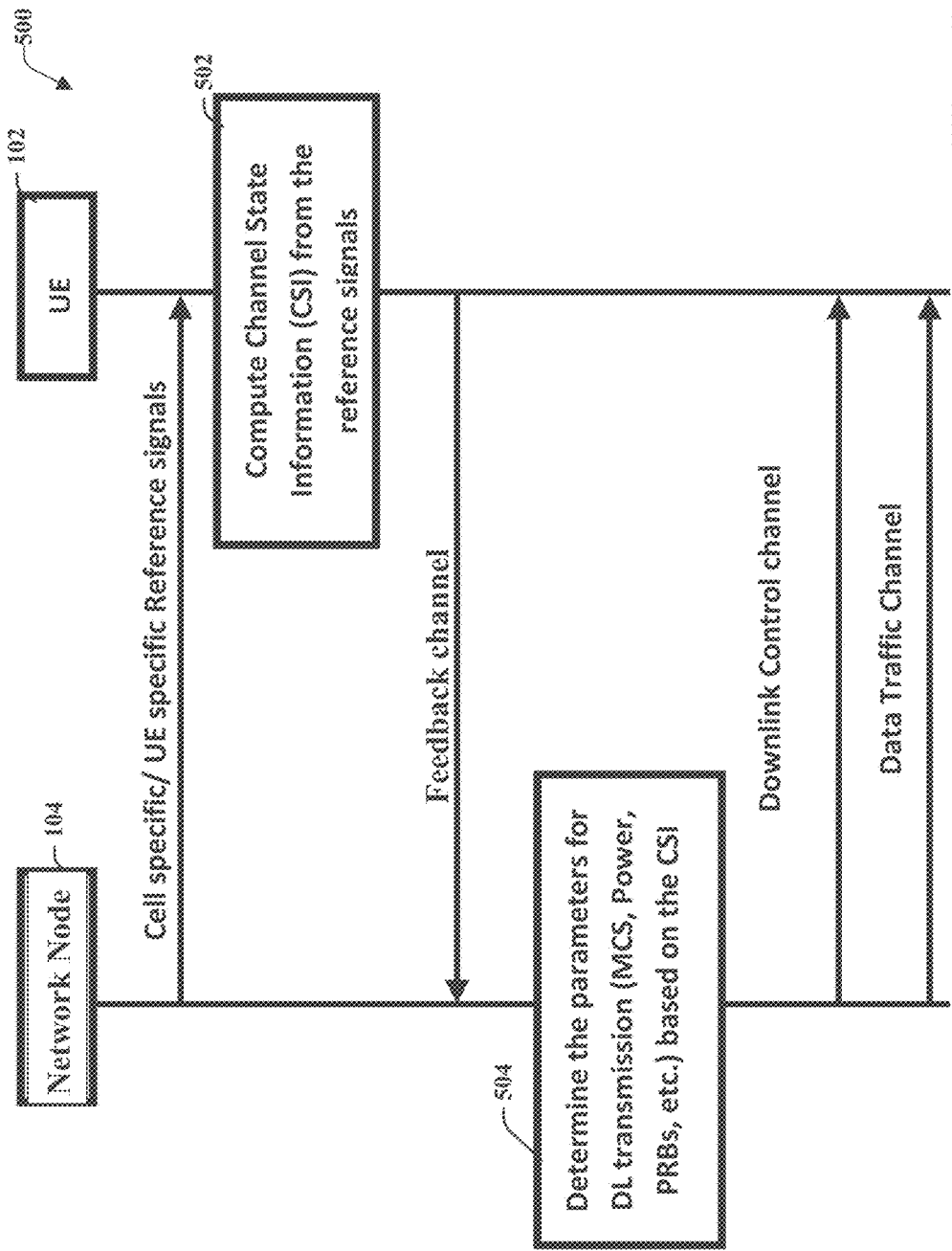
FIG. 5 illustrates an example schematic system block diagram of a message sequence chart between a network node and user equipment according to one or more embodiments.

Referring now to FIG. 5, illustrated is an example schematic system block diagram of a message sequence chart between a network node and user equipment according to one or more embodiments. FIG. 5 depicts a message sequence chart for downlink data transfer in 5G systems 500. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 502. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at block 504, which are particular to the user equipment 102. The scheduling parameters at block 504 can comprise modulation and coding schemes (MCS), power, physical resource blocks (PRBs), etc. FIG. 5 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Referring now to FIG. 6, illustrated is an example schematic system block diagram of a 15 KHz channel state information reference signals transmission with mixed numerology according to one or more embodiments. The proposed design can support different numerologies between the CSI-RS and the underlying PDSCH. Therefore, the user equipment specific CSI-RS can be transmitted with the same numerology as what the user equipment is configured at a given instance and not require the support of different numerologies at the user equipment at any given instance. FIG. 6 depicts a specific CSI-RS with a 15 KHz numerology transmitted throughout the system bandwidth irrespective of the underlying PDSCH 608 numerology. 15 KHz numerology can comprise CSI-RS 610, which is equivalent to the PDSCH 608 resource blocks 612. Consequently, CSI-RS 602 can be used at the 60 KHz numerology 600, which is less that the standard PDSCH 608 resource block 606. Therefore, remaining resources 604 are not unnecessarily tied up.

Referring now to FIG. 7, illustrated is an example schematic system block diagram of a 60 KHz channel state information reference signals transmission with mixed numerology according to one or more embodiments. FIG. 7 depicts a case where a user equipment specific CSI-RS with 60 KHz numerology 700 is transmitted throughout the system bandwidth irrespective of the underlying PDSCH numerology, PDSCH of 15 KHz 706. 60 KHz numerology 700 can comprise CSI-RS 702, which are equivalent to the PDSCH resource blocks 704. Consequently, CSI-RS 710 can be used at the 15 KHz numerology 706, which is less that the standard PDSCH resource block 708. Therefore, remaining resources 712 are not unnecessarily tied up because there is no transmission tying up these resources. When the numerology between the CSI-RS 710 and PDSCH 708 is different, then it is potentially difficult and perhaps inefficient to rate match the PDSCH 708 transmission around the CSI-RS 710. Furthermore the rate matching can depend on the difference between the numerology of the PDSCH 708 and the CSI-RS 710. While rate matching the PDSCH 708 around the CSI-RS 710 is viable, additional resources need to be rate matched to reduce the interference due to the CSI-RS 710. However, if the PDSCH 708 and the CSI-RS 710 transmission overlap each other, additional efficiencies can be generated.

Figure 8:
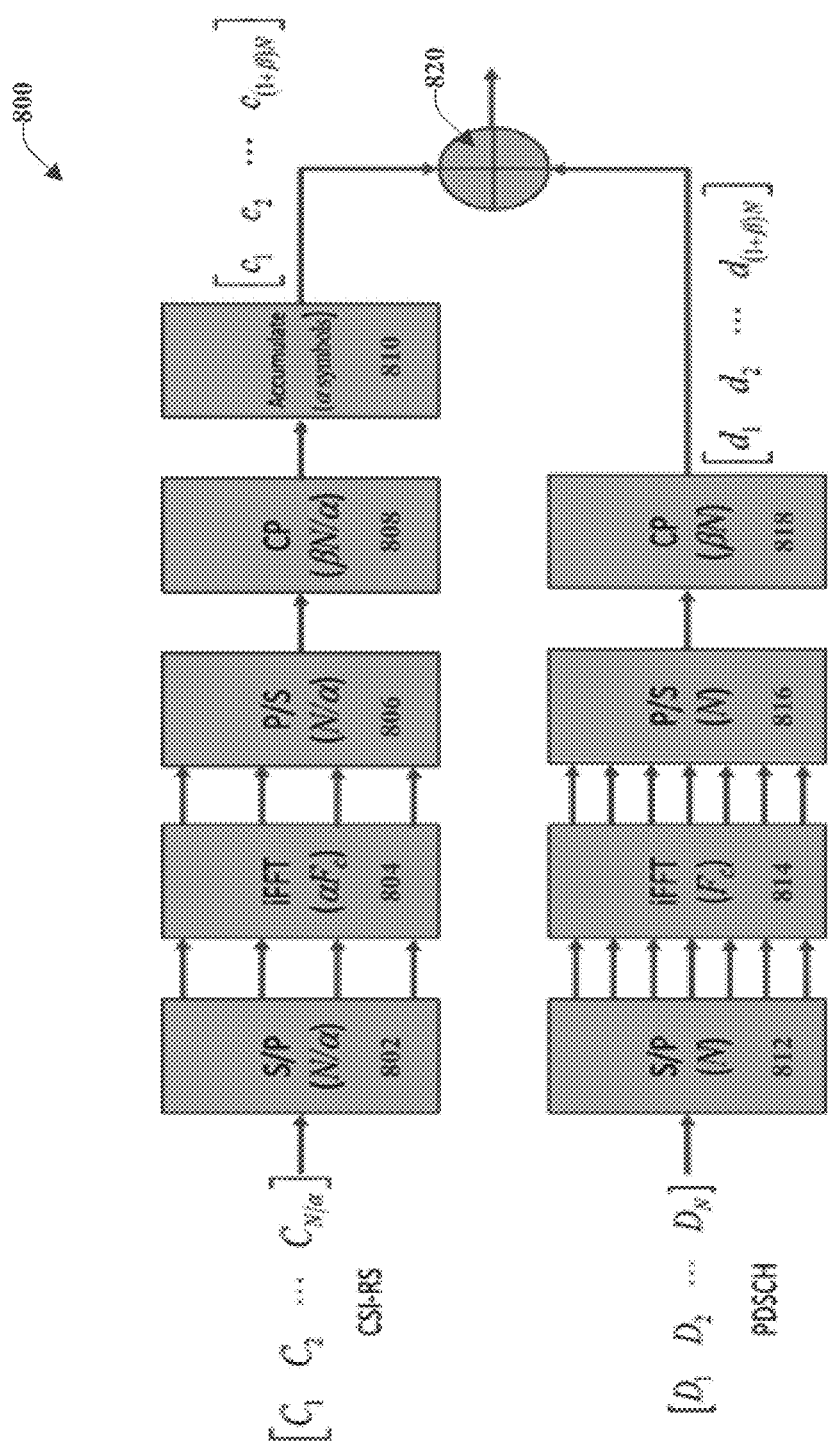
FIG. 8 illustrates an example schematic system block diagram of an example schematic system block diagram of transmitter for a mixed numerology signal in NR according to one or more embodiments.
Figure 9:
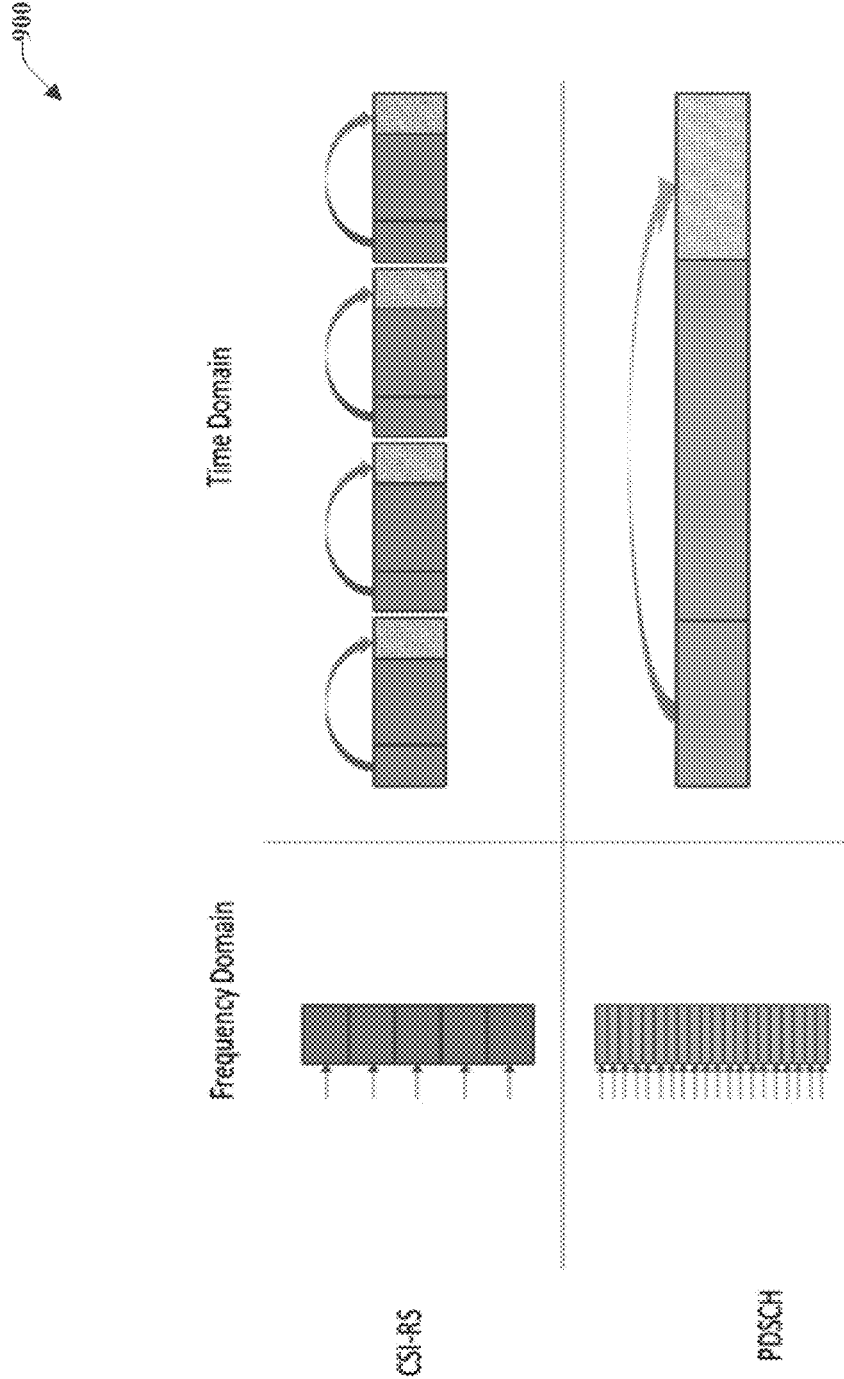
FIG. 9 illustrates an example schematic system block diagram of an example schematic system block diagram of a frequency and time domain for different numerologies according to one or more embodiments.

Referring now to FIGS. 8 and 9, illustrate representations of a mixed numerology signal. FIG. 8 depicts various signal processing steps associated with the multiple numerologies and FIG. 9 depicts a time domain and frequency domain representation of the multiple numerologies. FIG. 8 illustrates CSI-RS signals that can be sent through a serial format to parallel format block 802, the output of the serial format to parallel format block 802 can then be sent to an inverse FFT block 804, the output from the inverse FFT block 804 can then be sent to a parallel to serial block 806, the output from the parallel to serial block 806 can then be sent to a cyclic prefix (CP) block 808, and then the output from the CP block 808 (e.g., symbols) can be transmitted to a symbol accumulation block 810 (e.g., running the FFT twice). The PDSCH signals can be sent through a serial format to parallel format block 812, the output from the serial format to parallel format block 812 can then be sent to an inverse FFT block 814, the output from the inverse FFT block 814 can then be sent to a parallel format to serial format block 816, and then the output from the parallel format to serial format block 816 can be sent to a CP block 818. The resulting signals from the symbol accumulation block 810 and the CP block 818 can then experience a summation at block 818. It should be understood that a symbol level alignment between the multiple numerologies is assumed to exist, which is stems from choosing the same fraction of the OFDM symbol as the CP ($\beta$) and by the fact that the scaling of the numerologies ($\alpha$) is given by 2k, where k is an integer.

At the receiver only 1 FFT can be matched to the numerology of the PDSCH used since the PDSCH is the intended signal that the receiver needs to detect. Even though the numerology of the CSI-RS is different from the PDSCH, it can be known by the receiver. Consequently, the receiver can have a-priori knowledge of the CSI-RS numerology as well as the CSI-RS sequence based on a configuration and/or pre-configuration of the receiver.

Since it can be assumed that the receiver knows the interfering CSI-RS sequence and the numerology of CSI-RS the receiver (e.g., UE) can also obtain this information via a network assistance procedure (e.g., the base station associated with the network can send signal interference data to the UE). Therefore, since the numerology and the CSI-RS sequence is known at the receiver, it is possible to construct a version of the CSI-RS, once is it passes through an FFT matched to the PDSCH. The time domain CSI-RS signal at the transmitter can be given by Equation (6):

Equation (6):

$$C_{l,m} = \sum_{j=1}^{N/\alpha} c_{l,j} e^{2\pi i (m-1)(j-1)\alpha/N} m, \ j \in [1, N/\alpha], \quad (6.1)$$

where $C_{l,m}$ is the CSI-RS in the time domain signal with 'l' as the OFDM symbol index, and 'm' as the sample (time bin) index with the given OFDM symbol. Similarly $c_{l,j}$, is the CSI-RS in the frequency domain with 'l' as the OFDM symbol index and 'j' is the sub-carrier (frequency bin) index. At the receiver when the signal is passed through the FFT stage with a different numerology, the resulting CSI-RS can be written as:

$$\tilde{c}_{j'} = \frac{1}{N} \sum_{l=1}^{\alpha} \sum_{m=1}^{N/\alpha} C_{l,m} e^{-2\pi i (m'-1)(j'-1)/N} = \quad \text{Equation (7)}$$

-continued $$\sum_{l=1}^{\alpha} \sum_{j=1}^{N/\alpha} c_{l,j} \left[ \frac{1}{N} \sum_{m=1}^{N/\alpha} e^{2\pi i(m-1)(j-1)\alpha/N} e^{-2\pi i(m'-1)(j'-1)/N} \right]$$

In Equation (7), the terms inside the $2^{nd}$ summation do not depend on the sequence $c_{l,j}$ and it models the energy seen from the different FFT bins of the transmitter into a given FFT bin at the receiver due to the numerology mismatch between the two. Therefore the net signal from the CSI-RS at the receiver can be written as Equation (8):

$$\tilde{c}_{l',j'} = \sum_{j=1}^{N/\alpha} c_{l,j} \phi_l(j, j') \qquad \text{Equation (8)}$$

$$\phi_l(j, j') = \frac{1}{N} \sum_{m=1}^{N/\alpha} e^{2\pi i(m-1)(j-1)\alpha/N} e^{-2\pi i(m'-1)(j'-1)/N}$$

The term $\phi_l(j,j')$ does not depend on the CSI-RS sequence and can be computed for each possible combination of numerology mix. Then the receiver can thereby generate the net signal from the CSI-RS as seen from its FFT engine and subsequently actively cancel the signal. The function $\phi_l(j,j')$ depends only on the difference between $\phi j - j'$.

Figure 10:
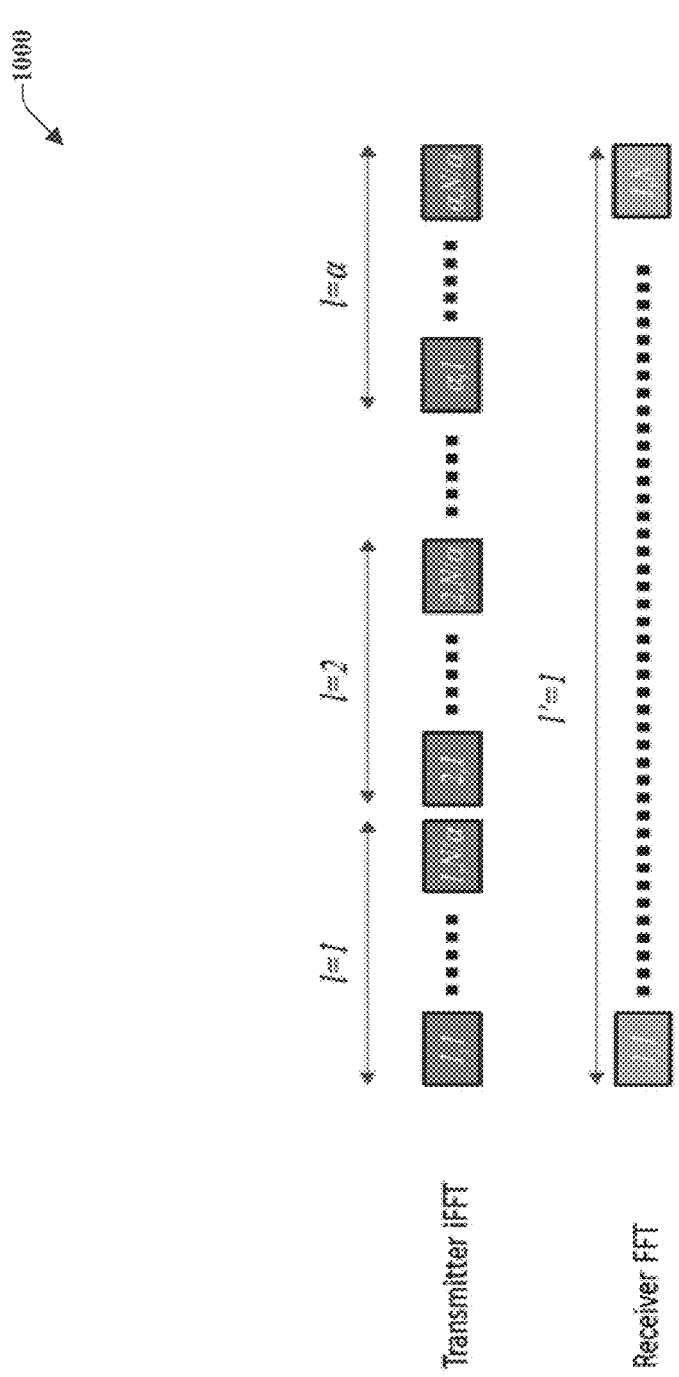
FIG. 10 illustrates an example schematic system block diagram of an example schematic system block diagram of transmitter and receiver fast fourier transform (FFT) bin relationship according to one or more embodiments.

Referring now to FIG. 10, illustrated is an example flow diagram for an example schematic system block diagram of transmitter and receiver fast fourier transform (FFT) bin relationship according to one or more embodiments. Since the FFT engines at the transmitter and receiver can operate on different numerologies, the symbol index and the sample index at the transmitter (l,m) and at the receiver (l',m') can be considered, as illustrated in FIG. 10. Therefore Equation (9) can be derived from FIG. 10:

$$m' = m + (l-1)N/\alpha \qquad \text{Equation (9):}$$

Figure 11:
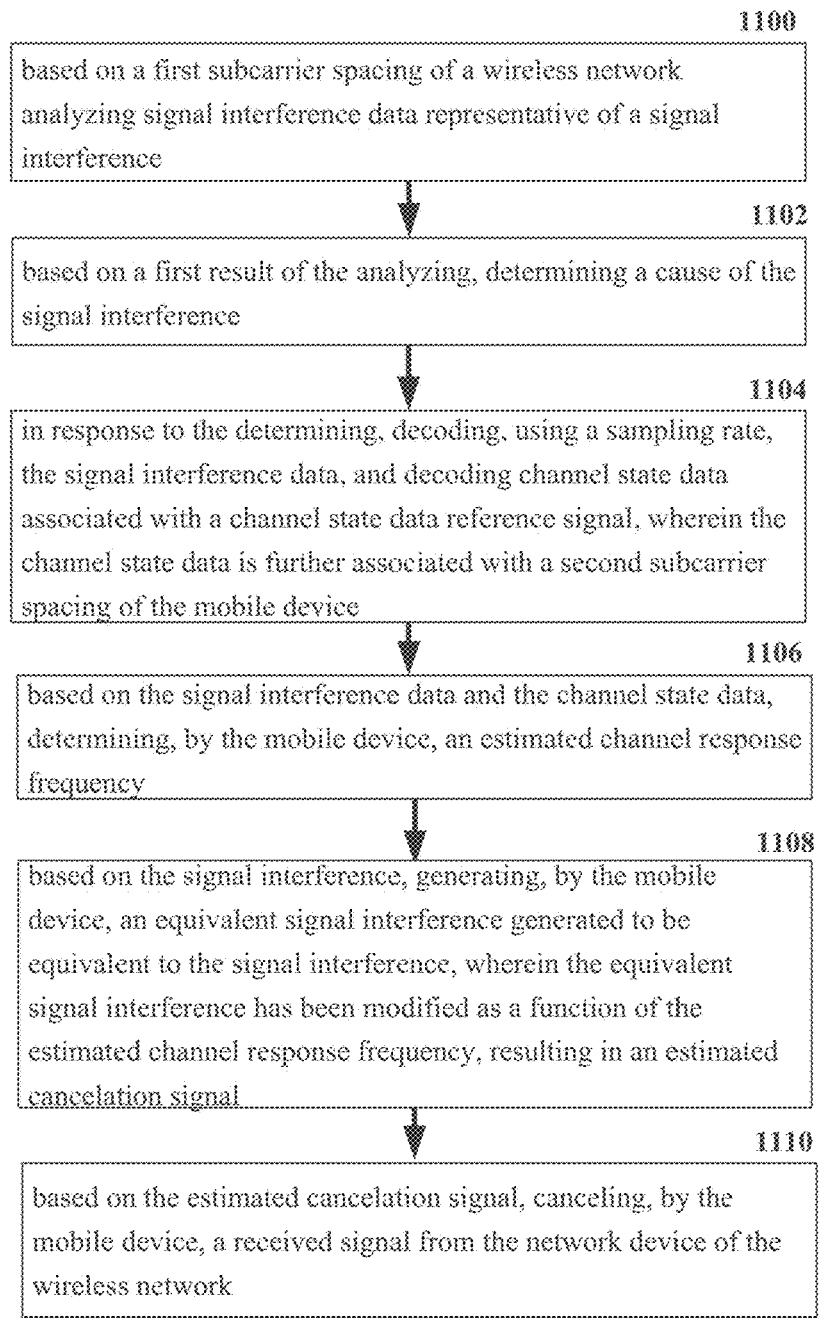
FIG. 11 illustrates an example flow diagram for a mixed numerology cancellation procedure for a 5G network according to one or more embodiments.

Referring now to FIG. 11, illustrated is an example flow diagram for a mixed numerology cancellation procedure according to one or more embodiments. At element 1100, based on a first subcarrier spacing of a wireless network a method can analyze signal interference data representative of a signal interference (e.g., UE 102). At element 1102, based on a first result of the analyzing, the method can determine a cause of the signal interference (e.g., UE 102). In response to the determining, at element 1104 the method can decode the signal interference data, and decoding channel state data associated with a channel state data reference signal, wherein the channel state data is further associated with a second subcarrier spacing of the mobile device (e.g., UE 102). At element 1106, based on the signal interference data and the channel state data, the method can determine an estimated channel response frequency (e.g., UE 102). At element 1108, based on the signal interference, the method can generate an equivalent signal interference generated to be equivalent to the signal interference (e.g., UE 102), wherein the equivalent signal interference has been modified as a function of the estimated channel response frequency, resulting in an estimated cancellation signal; and at element 1110, based on the estimated cancellation signal, the method can cancel a received signal from the network device (e.g., network node 104) of the wireless network.

Figure 12:
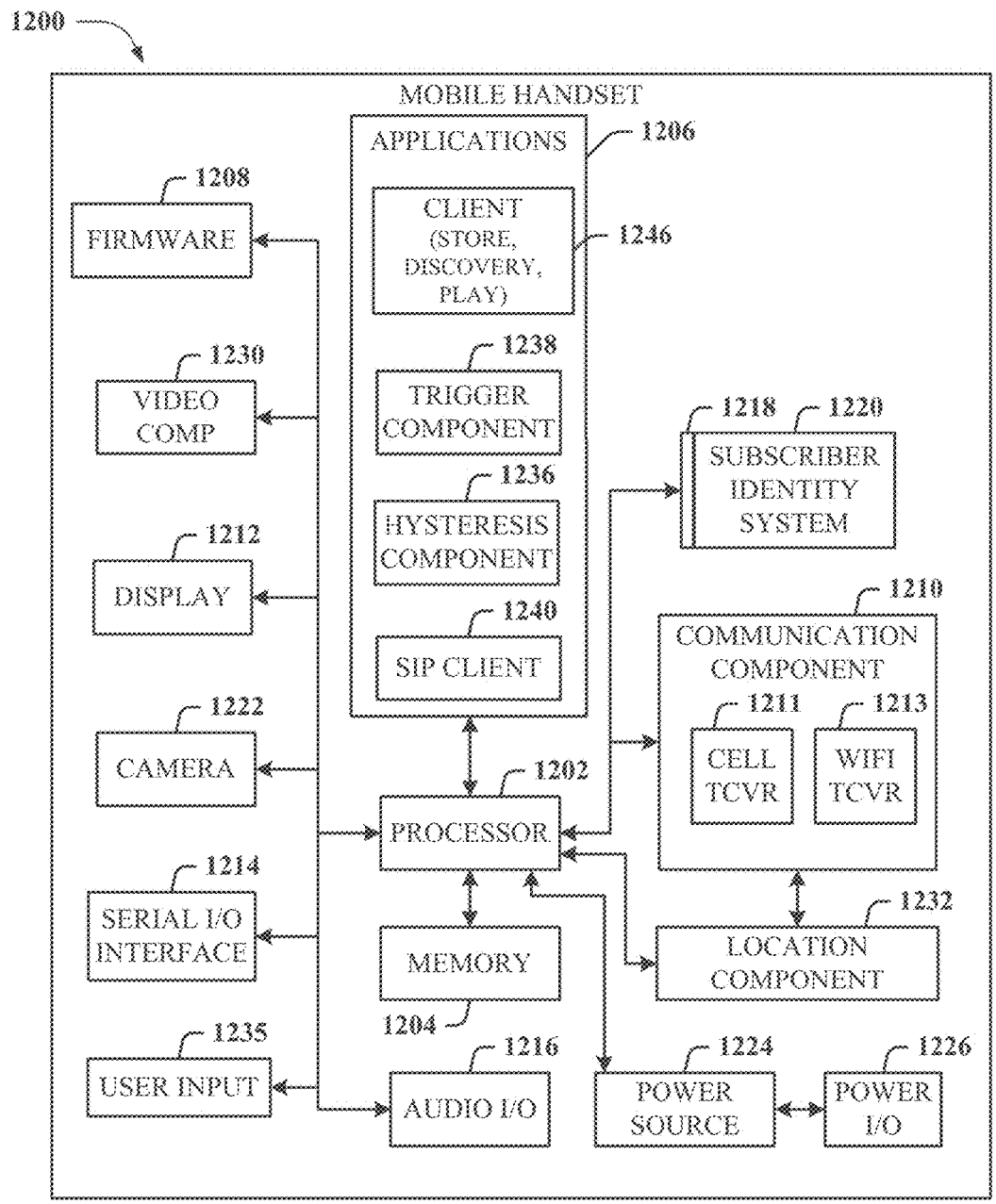
FIG. 12 illustrates an example block diagram of an example mobile handset operable to engage in a system architecture that facilitates secure wireless communication according to one or more embodiments described herein.

Referring now to FIG. 12, illustrated is a schematic block diagram of an exemplary end-user device such as a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
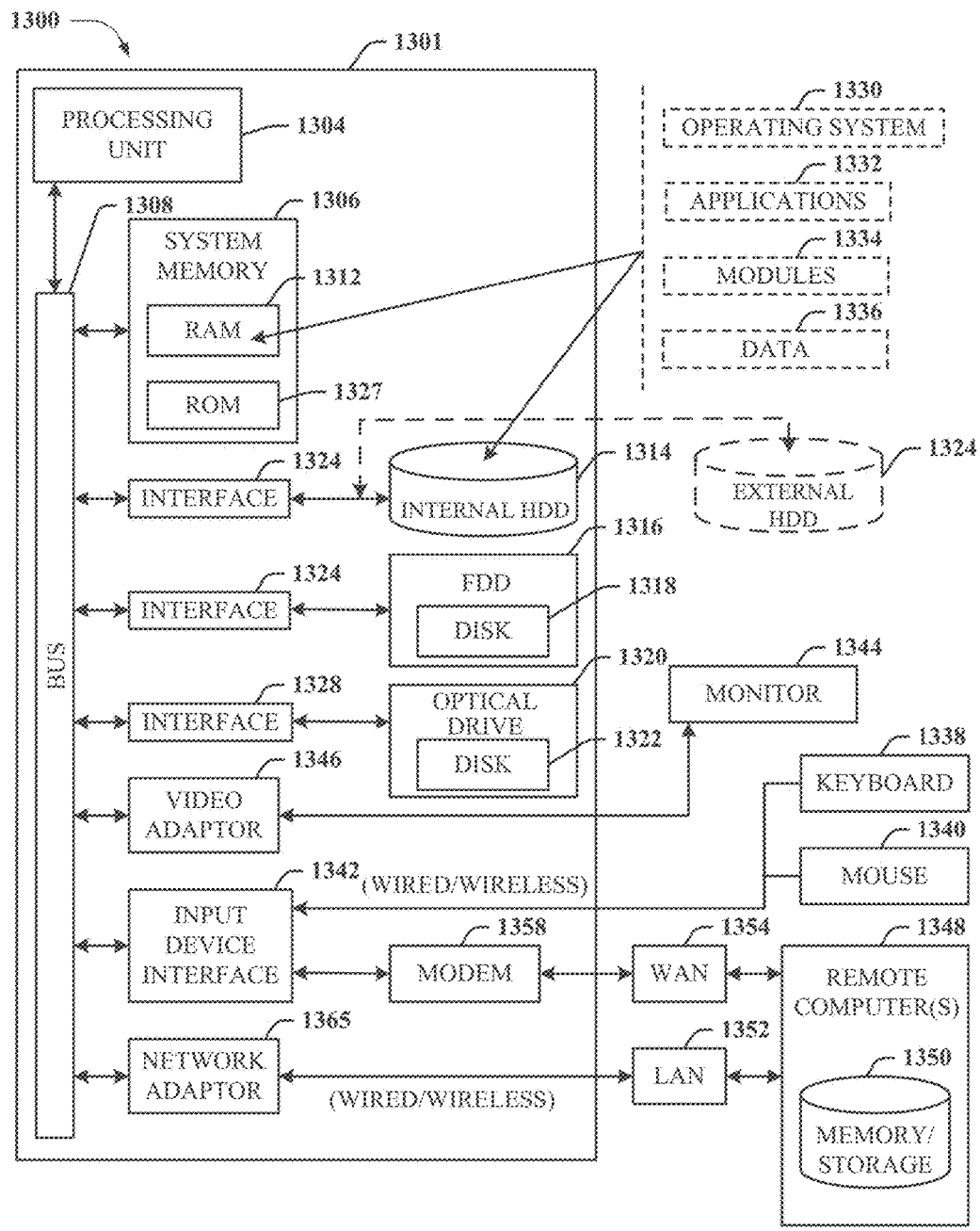
FIG. 13 illustrates an example block diagram of an example computer operable to engage in a system architecture that facilitates secure wireless communication according to one or more embodiments described herein.

Referring now to FIG. 13, there is illustrated a block diagram of a computer 1300 operable to execute a system architecture that facilitates establishing a transaction between an entity and a third party. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1313. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1300 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An important aspect of 5G, which differentiates from previous 4G systems, is the use of multiple numerologies. LTE systems use a single numerology throughout the whole in band (i.e., within LTE bandwidth, for example—within 10 MHz, all the subcarriers can have spacing or bandwidth of 15 KHz). However, since 5G can support various applications, single numerology as in LTE is not efficient. Hence, multiple numerologies are defined to serve diverse applications. For example, multiple subcarrier spacing such as 15 KHz, 30 KHz, 60 KHz, 120 KHz, 240 KHz and 480 KHz.

Interference cancellation based solutions can suffer when the CSI-RS of one numerology is super imposed on the PDSCH of another numerology because it uses multiple FFT engines simultaneously in the receiver to cancel the signal with a different numerology than the numerology of the signal it is trying to receive. Such a constraint can be limiting especially as the number of numerologies that are dynamically mixed increase, which increases the complexity of the receiver.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    based on a first subcarrier spacing of a wireless network, analyzing, by a mobile device comprising a processor, signal interference data representative of a signal interference;
    based on a first result of the analyzing, determining, by the mobile device, a cause of the signal interference;
    in response to the determining, decoding, by the mobile device using a sampling rate, the signal interference data, and decoding channel state data associated with a channel state data reference signal, wherein the channel state data is further associated with a second subcarrier spacing of the mobile device;
    based on the signal interference data and the channel state data, determining, by the mobile device, an estimated channel response frequency, wherein the determining the estimated channel response frequency comprises subtracting the second subcarrier spacing of the mobile device;
    based on the signal interference, generating, by the mobile device, an equivalent signal interference generated to be equivalent to the signal interference, wherein the equivalent signal interference has been modified as a function of the estimated channel response frequency, resulting in an estimated cancelation signal;
    based on the estimated cancelation signal, canceling, by the mobile device, a received signal from a network device of the wireless network; and
    based on physical downlink shared channel data associated with the signal interference, receiving, by the mobile device via a radio resource control signal, a request to transmit the channel state data at aperiodic intervals.

2. The method of claim 1, further comprising:
    determining, by the mobile device, that the first subcarrier spacing is not the second subcarrier spacing.

3. The method of claim 1, wherein the decoding comprises applying a fast fourier transform to the decoding of the signal interference data and the decoding of the channel state data based on the sampling rate.

4. The method of claim 1, further comprising:
    converting, by the mobile device, the received signal from a serial format to a parallel format.

5. The method of claim 1, wherein the mobile device is preconfigured to analyze the signal interference data in response to receiving the signal interference data.

6. The method of claim 1, wherein the received signal encodes information associated with the physical downlink shared channel of the mobile device, and wherein a modifying comprises multiplying the equivalent signal interference by the estimated channel response frequency.

7. The method of claim 1, wherein the decoding of the signal interference is a first decoding, wherein the decoding of the channel state data is a second decoding and further comprising:
initiating, by the mobile device, a third decoding, and wherein the third decoding is not based on the cause of the signal interference.

8. A system, comprising:
a processor; and
a memory that stores executable instructions that, when executed by the processor, facilitate performance of operations, comprising:
based on a first subcarrier spacing of a wireless network, analyzing signal interference data representative of a signal interference;
determining a cause of the signal interference;
in response to the determining the cause of the signal interference, determining an estimated channel response frequency, decoding the signal interference data using a sampling rate, and decoding channel state data, associated with a channel state data reference signal, associated with a second subcarrier spacing of the wireless network, wherein the determining the estimated channel response frequency comprises subtracting the second subcarrier spacing of the wireless network;
in response to a condition being determined to have been satisfied, generating an equivalent signal interference to the signal interference;
modifying the equivalent signal interference as a function of the estimated channel response frequency, resulting in an estimated cancelation signal;
based on the estimated cancelation signal, canceling a received signal from a network device of the wireless network; and
based on physical downlink shared channel data associated with the signal interference, receiving, via a radio resource control signal, a request to transmit the channel state data according to an aperiodic interval.

9. The system of claim 8, wherein the condition is associated with a failed cyclic redundancy check for the physical downlink shared channel data.

10. The system of claim 8, wherein the modifying comprises multiplying equivalent signal interference data associated with the equivalent signal interference with estimated channel response frequency data associated with the estimated channel response frequency.

11. The system of claim 8, wherein the signal interference data is first signal interference data, and wherein the operations further comprise:
receiving second signal interference data from the network device to facilitate signal interference cancelation.

12. The system of claim 11, wherein the receiving the second signal interference data is in response to determining a scheduling parameter for transmission to a mobile device.

13. The system of claim 8, wherein the analyzing the signal interference data is based on a configuration of a mobile device.

14. The system of claim 8, wherein the first subcarrier spacing is different from the second subcarrier spacing.

15. A non-transitory machine-readable storage medium, comprising executable instructions that, when executed by a processor, facilitate performance of operations, comprising:
receiving first channel state data reference signals associated with first signal interference data;
in response to the receiving the first channel state data reference signals, facilitating canceling the first channel state data reference signals based on a condition associated with a mobile device;
based on a first subcarrier spacing of a wireless network, analyzing second signal interference data representative of a second channel state data reference signal, not of the first channel state data reference signals;
based on the analyzing, decoding the second signal interference data and decoding the channel state data to determine an estimated channel response frequency, wherein determination of the estimated channel response frequency comprises removing a second subcarrier spacing associated with the mobile device; and
based on a physical downlink shared channel associated with the second signal interference data, receiving, via a radio resource control signal, a request to transmit the channel state data at aperiodic intervals.

16. The non-transitory machine-readable storage medium of claim 15, wherein the second signal interference data is decoded at a first sampling rate and the channel state data is decoded at a second sampling rate.

17. The non-transitory machine-readable storage medium of claim 16, wherein the channel state data is associated with a channel state data reference signal.

18. The non-transitory machine-readable storage medium of claim 15, wherein operations further comprise:
generating third signal interference data to be equivalent to the estimated channel response frequency.

19. The non-transitory machine-readable storage medium of claim 18, wherein the operations further comprise:
multiplying the equivalent signal interference by the estimated channel response frequency, resulting in an estimated cancelation signal.

20. The non-transitory machine-readable storage medium of claim 19, wherein the operations further comprise:
based on the estimated cancelation signal, canceling a third channel state data reference signal from a network device of the wireless network.

* * * * *